(12) United States Patent
Yu et al.

(10) Patent No.: US 11,823,077 B2
(45) Date of Patent: Nov. 21, 2023

(54) PARALLELIZED SCORING FOR ENSEMBLE MODEL

(71) Applicant: International Business Machines Corporation, Armonk, NY (US)

(72) Inventors: Dong Hai Yu, Xian (CN); Jun Wang, Xian (CN); Jing Xu, Xian (CN); Ji Hui Yang, Beijing (CN); Xiao Ming Ma, Xian (CN); Song Bo, Xian (CN)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 16/992,856

(22) Filed: Aug. 13, 2020

(65) Prior Publication Data
US 2022/0051116 A1   Feb. 17, 2022

(51) Int. Cl.
*G06N 5/04* (2023.01)
*G06N 20/20* (2019.01)
*G06F 16/28* (2019.01)

(52) U.S. Cl.
CPC ............. *G06N 5/04* (2013.01); *G06F 16/285* (2019.01); *G06N 20/20* (2019.01)

(58) Field of Classification Search
CPC ......... G06N 5/04; G06N 20/20; G06F 16/285
See application file for complete search history.

(56) References Cited

U.S. PATENT DOCUMENTS

| | | | | |
|---|---|---|---|---|
| 7,958,068 | B2 * | 6/2011 | Smith | .................... G06F 18/254 706/20 |
| 9,710,751 | B2 | 7/2017 | Cichosz et al. | |
| 10,387,214 | B1 * | 8/2019 | Christian | .............. G06F 3/0481 |
| 10,555,689 | B1 * | 2/2020 | Marquez | .............. A61B 5/1122 |
| 11,182,640 | B2 * | 11/2021 | Jean | ..................... G06F 16/5854 |
| 2017/0318430 | A1 * | 11/2017 | Ganti | ....................... G06F 18/23 |
| 2018/0060324 | A1 | 3/2018 | Clinton et al. | |
| 2018/0060330 | A1 | 3/2018 | Clinton et al. | |
| 2019/0130277 | A1 | 5/2019 | Andoni et al. | |

FOREIGN PATENT DOCUMENTS

KR     102038703 B1    7/2019

OTHER PUBLICATIONS

Mindell, 2015, Chapter 1, Chapter 7.*
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Michael I Ezewoko
(74) *Attorney, Agent, or Firm* — James L. Olsen

(57) ABSTRACT

Provided are a computer-implemented method, a system, and a computer program product. The method comprises extracting features from a plurality of base models in an ensemble model. The plurality of base models are configured to provide respective prediction results. The ensemble model is configured to provide an overall prediction result from the prediction results of the plurality of base models. The features are associated with time performance of the base models. The method further comprises clustering the plurality of base models into a plurality of clusters based on the extracted features. The method further comprises assigning the plurality of base models to a plurality of parallel computation units based on the plurality of clusters.

20 Claims, 13 Drawing Sheets

PARALLELIZED SCORING FOR ENSEMBLE MODEL

BACKGROUND

The present disclosure relates to a computing system, and more specifically, to a parallelized scoring system for an ensemble model.

Ensemble modeling such as random trees is a technique that creates multiple models and then combines the results of the models to produce an improved result. Ensemble modeling usually produces a more accurate solution than a single model would. The ensemble model can be very large and include thousands of base models. For example, an ensemble model can have up to more than 2000 decision trees, and the size of the model file can be more than four gigabytes (GB).

The ensemble model can often take a very long time in the prediction phase, which is undesirable, especially for real-time scoring. The performance of real-time scoring is critical in some applications such as credit card fraud. For example, the result is expected to be obtained in a specified time, possibly in milliseconds.

SUMMARY

According to some embodiments of the present disclosure, there is provided a computer-implemented method. The method comprises extracting, by one or more processing units, features from a plurality of base models in an ensemble model, the plurality of base models configured to provide respective prediction results, the ensemble model configured to provide an overall prediction result from the prediction results of the plurality of base models, the features associated with time performance of the base models; clustering, by the one or more processing units, the plurality of base models into a plurality of clusters based on the extracted features; and assigning, by the one or more processing units, the plurality of base models to a plurality of parallel computation units based on the plurality of clusters.

According to some further embodiments of the present disclosure, there is provided a system. The system comprises a processor; and a memory having instructions stored thereon for execution by the processor. The instructions, when executed by the processor, cause the system to perform a method comprising: extracting features from a plurality of base models in an ensemble model, the plurality of base models configured to provide respective prediction results, the ensemble model configured to provide an overall prediction result from the prediction results of the plurality of base models, the features associated with time performance of the base models; clustering the plurality of base models into a plurality of clusters based on the extracted features; and assigning the plurality of base models to a plurality of parallel computation units based on the plurality of clusters.

According to some further embodiments of the present disclosure, there is provided a computer program product, comprising a computer readable storage medium having program instructions embodied therewith, the program instructions executable by a processor to cause the processor to perform acts of: extracting features from a plurality of base models in an ensemble model, the plurality of base models configured to provide respective prediction results, the ensemble model configured to provide an overall prediction result from the prediction results of the plurality of base models, the features associated with time performance of the base models; clustering the plurality of base models into a plurality of clusters based on the extracted features; and assigning the plurality of base models to a plurality of parallel computation units based on the plurality of clusters.

The above summary is not intended to describe each illustrated embodiment or every implementation of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference indicators generally refer to the same components in the embodiments of the present disclosure. The drawings are only illustrative of certain embodiments and do not limit the disclosure.

Figure 1:
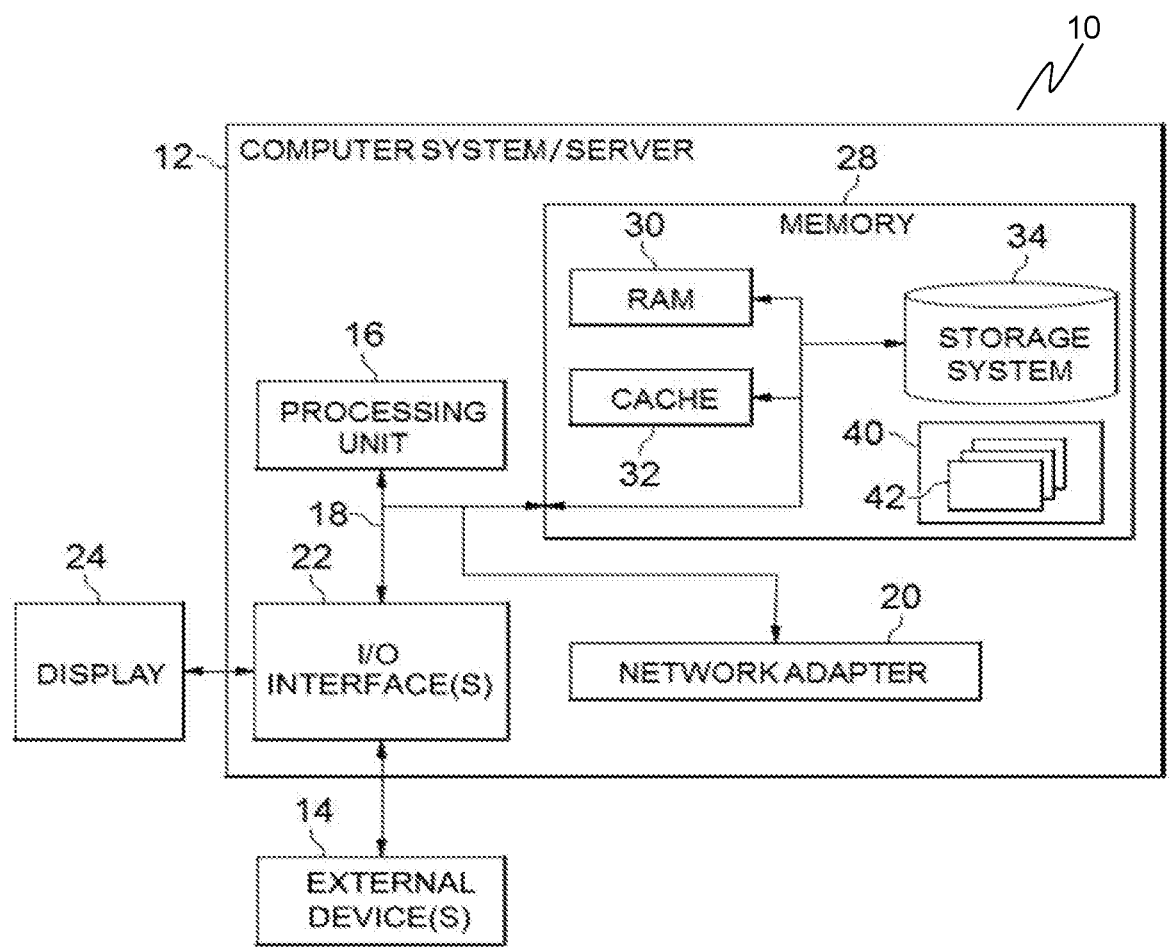
FIG. 1 shows a schematic of an example cloud computing node, according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which can in some embodiments take the form of a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, and data archival storage systems.

Figure 2:
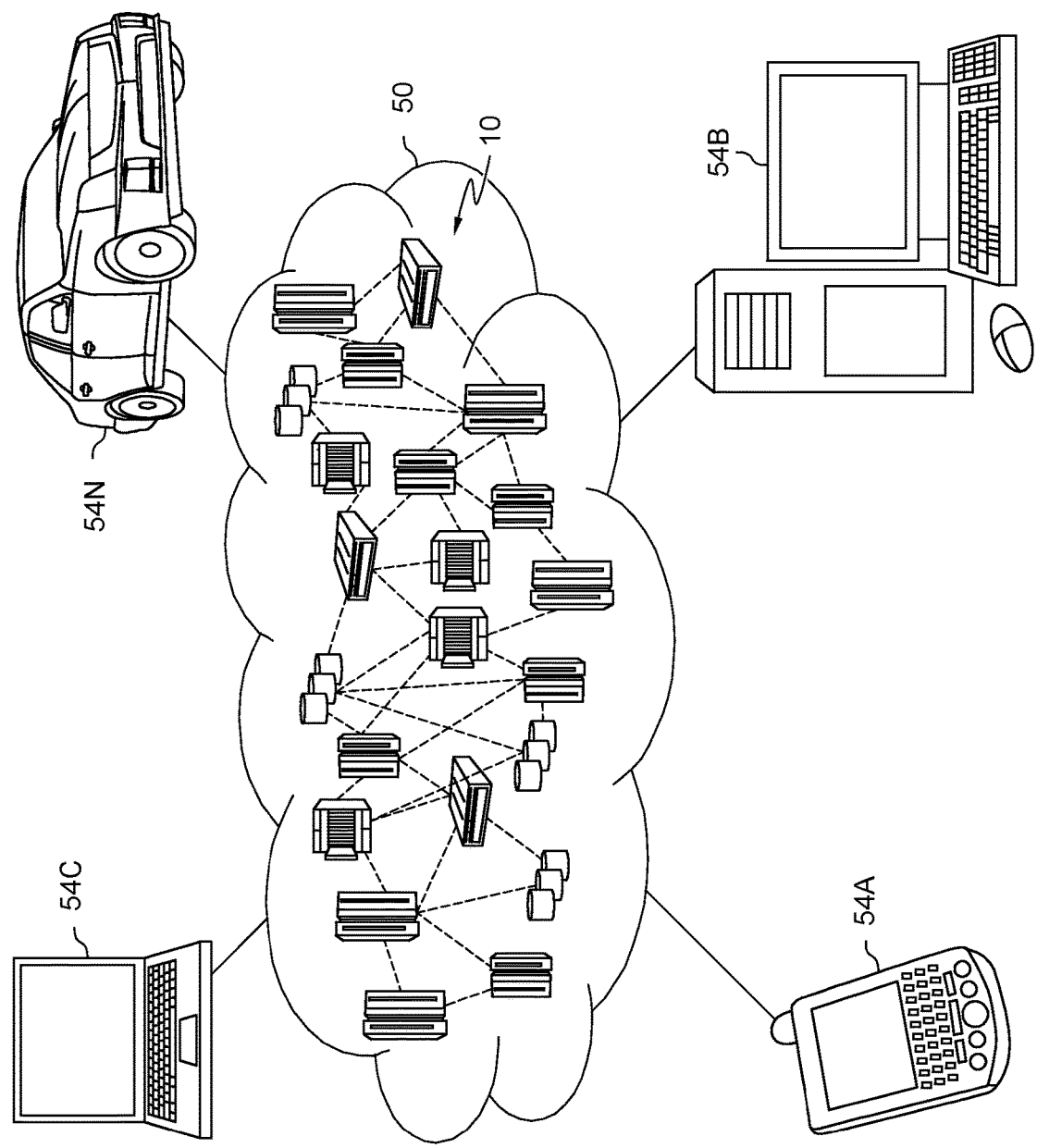
FIG. 2 shows a cloud computing environment, according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
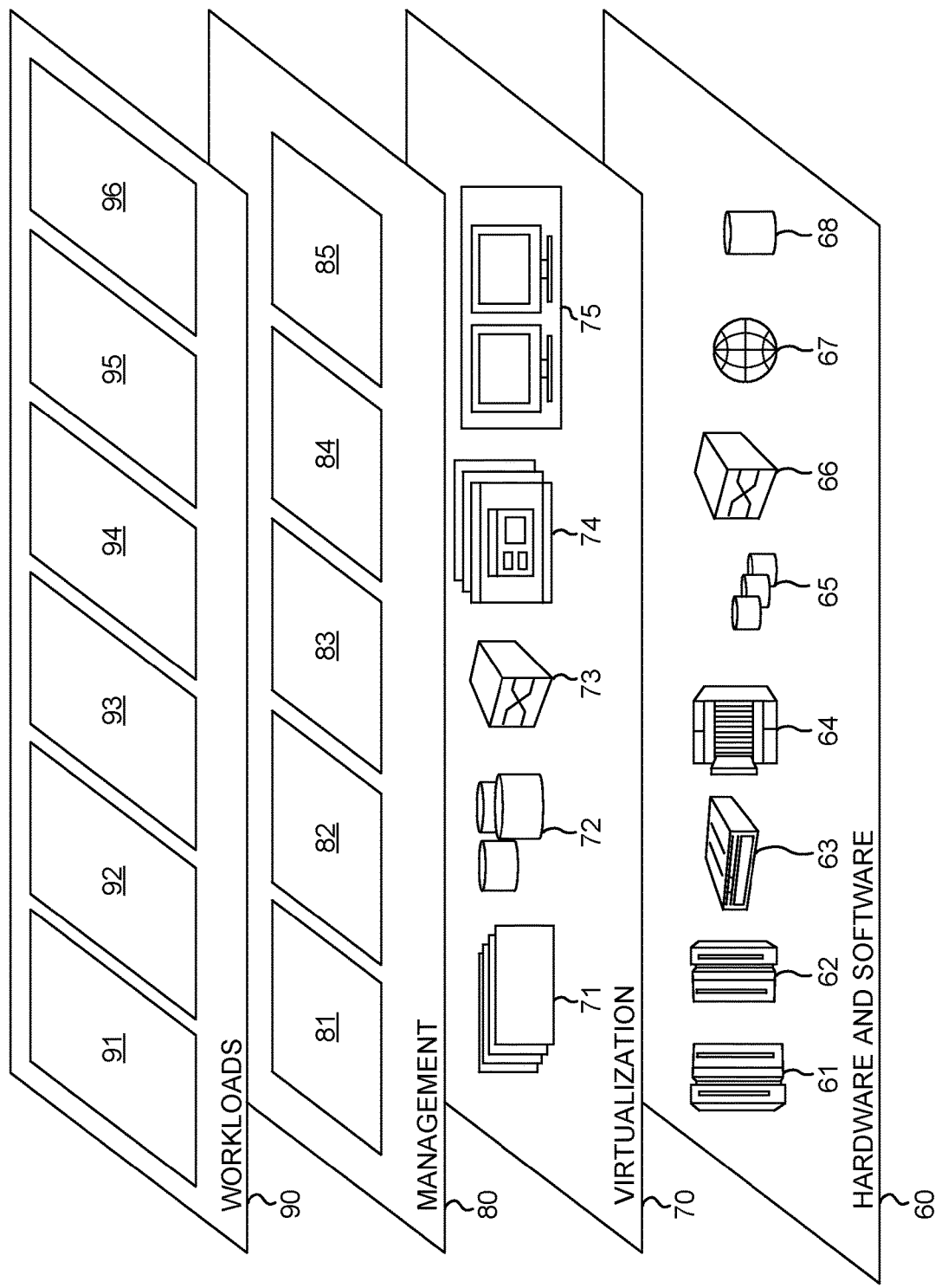
FIG. 3 shows abstraction model layers, according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parallelized scoring 96. Parallelized scoring 96 can be a parallelized scoring system for an ensemble model such as those described herein.

Figure 4:
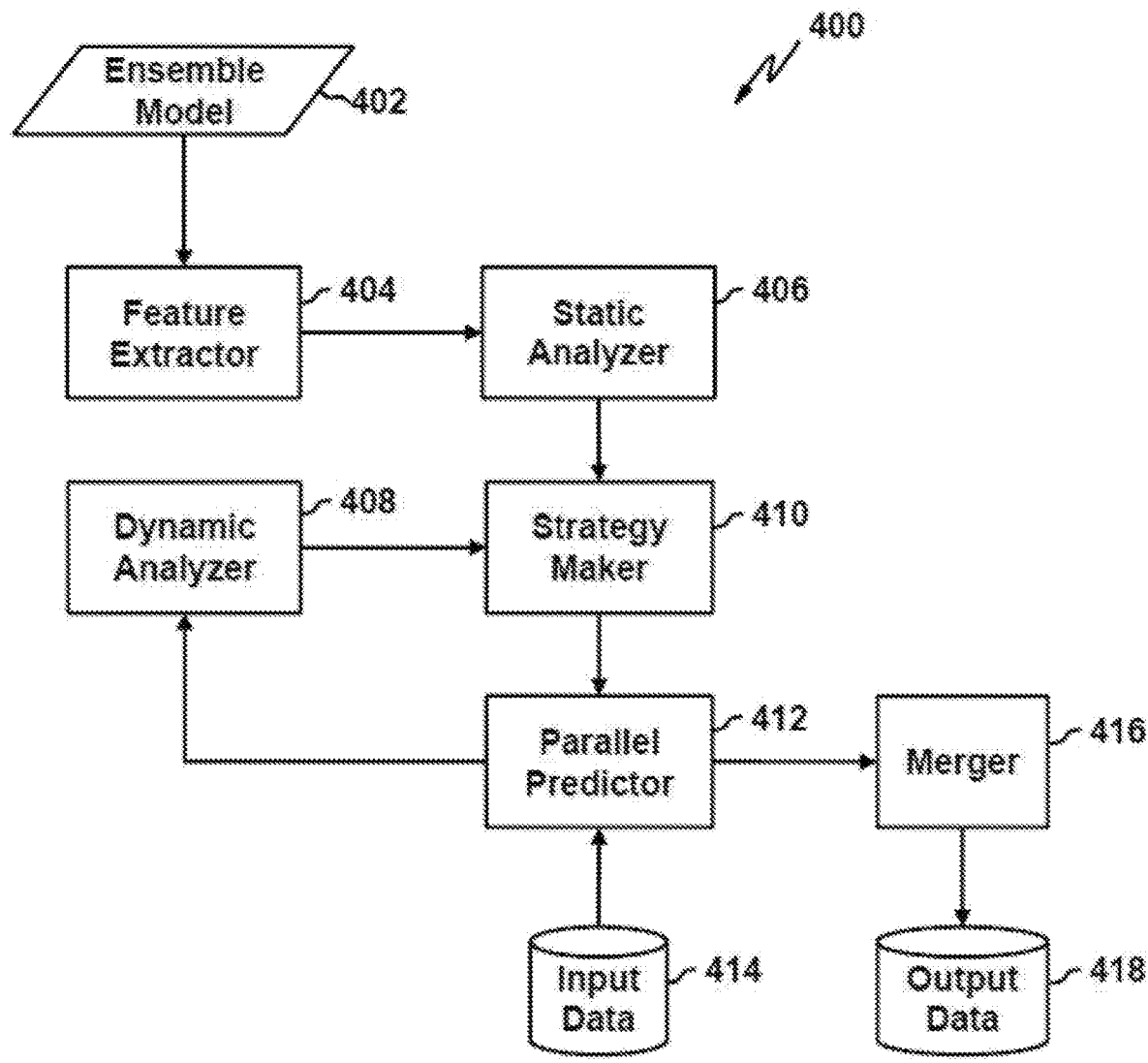
FIG. 4 shows a block diagram illustrating a paralleled scoring system for an ensemble model, according to some embodiments of the present disclosure.

With reference now to FIG. 4, an example of a paralleled scoring system 400 for an ensemble model is shown. Paralleled scoring system 400 is only one example of parallelized scoring 96 depicted in FIG. 3 and is not intended to suggest any limitation as to the scope of use or functionality of embodiments of the disclosure described herein.

In the ensemble model 402, multiple diverse models are created to predict an outcome, either by using many different modeling algorithms or using different training data sets. The ensemble model 402 then aggregates the prediction of each base model and results into one final prediction for the unseen data. The motivation for using ensemble models such as ensemble model 402 is to reduce the generalization error of the prediction. If the base models are diverse and independent, the prediction error of the model will decrease when the ensemble approach is used. The approach seeks the wisdom of crowds in making a prediction. Even though the ensemble model 402 has multiple base models within the model, it acts and performs as a single model.

Parallel scoring system 400 includes feature extractor 404 configured to extract features from base models in the ensemble model 402. Feature extractor 404 can build valuable information from raw data by reformatting, combining, and/or transforming primary features into new ones until it yields a new set of data that can be consumed by the models to achieve their goals. For example, feature extractor 404 can parse and extract a number of features from each base model. The extracted features can be performance related; for example, the extracted features may be associated with time performance or may be time-consuming.

In some embodiments, the base models can be tree models, and feature extractor 404 can extract a number of predefined features such as, but not limited to, a maximum depth of the tree, an average depth of the tree, the number of nodes in the tree, whether it is a tree model regression or classification, input variables, input continues number, input category number, the number of compound predicates, the number of simple predicates, the number of simple set predicates, and/or the like.

For example, feature extractor 404 may parse each base model and generate one record for each model. Each record can include respective values of the predefined features. For example, Table I shows an example of features extracted from tree base models. It is to be understood that Table I is provided for illustrative purpose only without suggesting any limitation to the scope of the present disclosure. As shown in Table I, the features for each model ID are assigned with respective values.

TABLE I

| Model ID | 1 | 2 | 3 | 4 | 5 | 6 | 7 | 8 | 9 | 10 |
|---|---|---|---|---|---|---|---|---|---|---|
| Max Depth | 9 | 18 | 19 | 30 | 10 | 15 | 20 | 16 | 29 | 25 |
| Average Depth | 3 | 8 | 6 | 3 | 9 | 6 | 4 | 8 | 3 | 8 |
| Number of Nodes | 1500 | 1100 | 1300 | 850 | 900 | 2000 | 3000 | 2000 | 1300 | 1900 |
| Regression or Classification | 1 | 0 | 1 | 0 | 1 | 1 | 1 | 0 | 1 | 0 |
| Input Variables | 20 | 30 | 25 | 15 | 40 | 19 | 20 | 30 | 18 | 20 |
| Input Continuous Number | 15 | 20 | 20 | 10 | 30 | 10 | 9 | 25 | 9 | 15 |
| Input Category Number | 5 | 10 | 5 | 5 | 10 | 9 | 11 | 5 | 9 | 5 |
| Number of Compound Predicate | 200 | 300 | 100 | 150 | 500 | 300 | 200 | 600 | 200 | 190 |
| Number of Simple Predicate | 150 | 300 | 500 | 200 | 300 | 190 | 160 | 120 | 108 | 190 |
| Number of Simple Set Predicate | 200 | 900 | 800 | 200 | 700 | 900 | 800 | 100 | 400 | 200 |

The tree models are only one example of the base models in the ensemble model and are not intended to suggest any limitation as to the scope of use or functionality of embodiments of the disclosure described herein. For example, the base models can include regression, neural network, and/or any other suitable models currently known or to be developed in the future. Feature extractor 404 can be adaptive to base models and extract different features from different base models. For example, if the base models include neural networks, some of the extracted features may be different from the ones shown in Table I. The number of neurons and the number of layers of neural networks will be important for the neural networks and may be taken into account in feature extraction.

Feature extractor 404 can generate a representation of each base model in the ensemble model. For example, the representation can be a vector representation of the extracted features. Taking Table I as an example, each base model can be represented by a vector with elements of the values for the extracted features.

The representations of the base models are provided to static analyzer 406, which is configured to group the base models based on the extracted features or representations of the base models such that base models are more similar to other base models in the same group and dissimilar to the base models in other groups. For example, static analyzer 406 can use cluster analysis to group the base models in such a way that the base models in the same cluster are more similar to each other than to those in other clusters. For example, a k-means algorithm can be used in cluster analysis. It is to be understood that the k-means algorithm is only one example of the method used in static analyzer 406 and is not intended to suggest any limitation as to the scope of use or functionality of embodiments of the disclosure described herein; instead, any other suitable grouping method currently known or to be developed in the future can be used. In response to grouping the base models, static analyzer 406 can label the base models with group identifiers (ID) for subsequent processing. For example, each base model can be assigned with its cluster ID.

Figure 5:
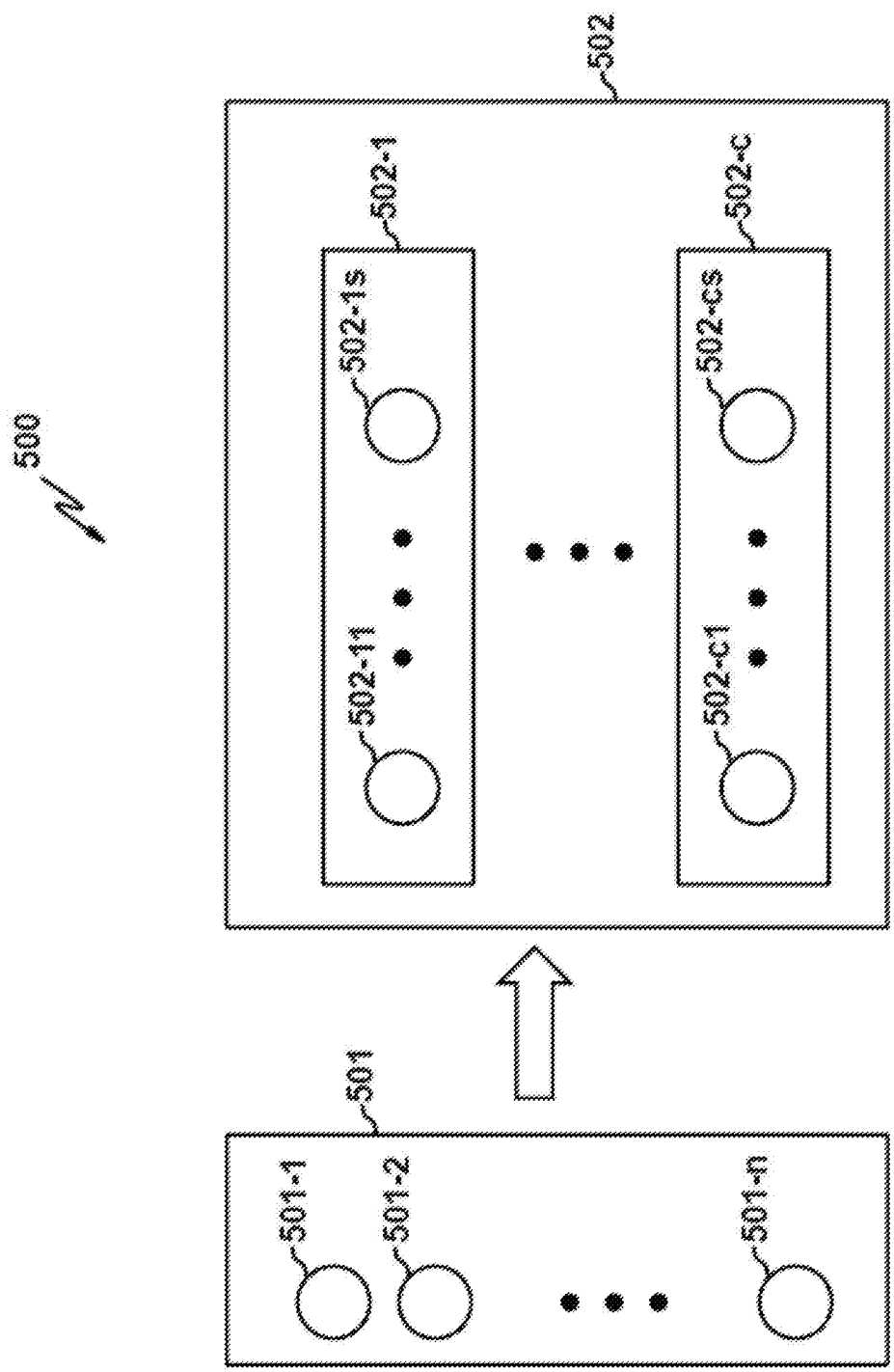
FIG. 5 shows a schematic diagram illustrating an example operation of the static analyzer of FIG. 4, according to some embodiments of the present disclosure.

Referring now to FIG. 5, shown is a schematic diagram 500 illustrating an example operation of the static analyzer 406 of FIG. 4 according to some embodiments of the present disclosure. As shown in FIG. 5, the ensemble model includes a number n of base models 501-1, 501-2, . . . , 501-$n$ (collectively referred to as base models 501). Static analyzer 406 groups base models 501 into a number c of groups, where each group has a number s of base models. For example, group 502-1 includes base models 502-11, . . . , 502-1$s$, and group 502-$c$ includes base models 502-$c$1, . . . , 502-$cs$. It is noted that each group can include a different number of base models, and the number s may vary from group to group.

Referring back to FIG. 4, upon grouping the base models into clusters, static analyzer 406 provides the grouping results to the strategy maker 410, which is configured to assign the base models from the groups or clusters across parallel computation units. The computation units can be processors, threads, or any suitable computation or processing units. Strategy maker 410 is configured to assign the base models in the same group or cluster to different computation units. As a result, similar base models will not be assigned to the same computation unit to achieve load equilibrium across the computation units. For example, strategy maker 410 may equally assign the base models into parallel computation units such that the same labeled models are assigned to different parallel computation units.

In some embodiments, strategy maker 410 is configured to assign the base models from the clusters in a round-robin type. For example, suppose that the number of computation units is N. Strategy maker 410 can loop the base models from cluster 1 and assign the base models to parallel computation units from 1 to N. Then, strategy maker 410 can loop the base models from cluster 2 and assign them to parallel computation units from k to k−1 (where k is the next computation unit from the previous step). Then, strategy maker 410 can repeat the same step for the other clusters, until all the base models are assigned to their respective computation units.

Figure 6:
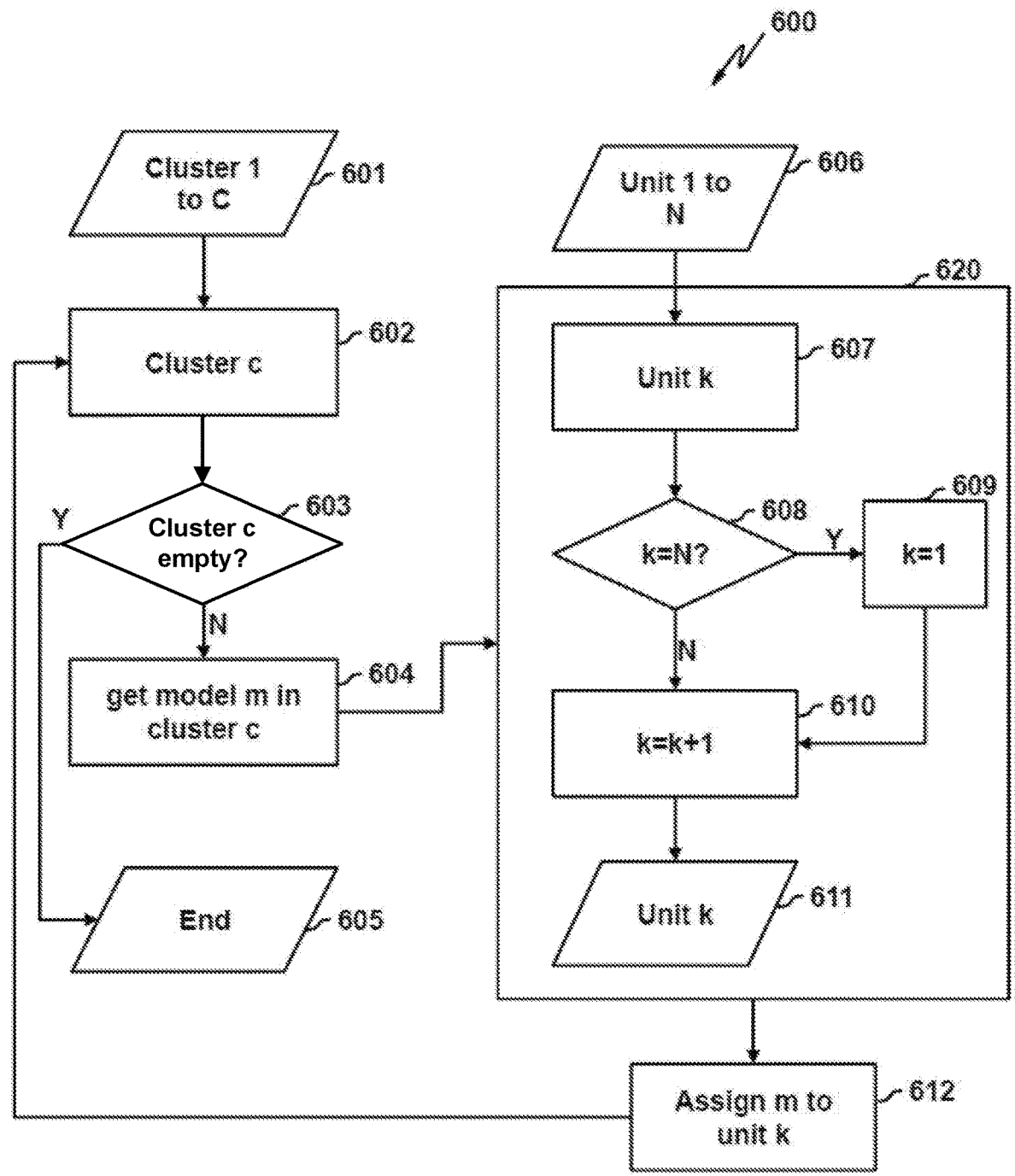
FIG. 6 shows a flowchart illustrating a method for assigning the base models from the clusters to parallel computation units, according to some embodiments of the present disclosure.

FIG. 6 shows a flowchart illustrating a method 600 for assigning the base models from the clusters to parallel computation units according to some embodiments of the present disclosure. Method 600 is an example implementation of assigning the base models in the round-robin type.

At block 602, method 600 selects a cluster c from the clusters 1 to C at input block 601. At block 603, it is determined whether cluster c is empty. If not, method 600 proceeds to block 604, where method 600 retrieves a base model m from cluster c and removes the base model m from the cluster c. At block 620, it is determined that the base model m should be assigned to the computation unit k. Block 620 contains a series of sub-blocks describing the process of assigning to the computation unit k as further discussed below. At block 612, the base model m is assigned to the determined computation unit k. Then, method 600 proceeds back to block 602. If it is determined at block 603 that the cluster c is empty, method 600 proceeds to block 605 to end the process. Method 600 can be repeated for each cluster in the set of clusters 1 to C in sequence, simultaneously, or otherwise, such that each model in each cluster is selected and reaches assignment at block 612.

Block 620 contains a series of sub-blocks 607-611. At block 607, a computation unit k is retrieved from computation units 1 to N at input block 606. At block 608, it is determined whether k equals to N. If not, method 600 proceeds to block 610, where k is incremented by one. At block 611, it is determined that the base model m should be assigned to the computation unit k. If it is determined at block 608 that k=N, method 600 proceeds to block 609, where k is reset to 1. Then, method 600 proceeds to block 610.

Figure 7:
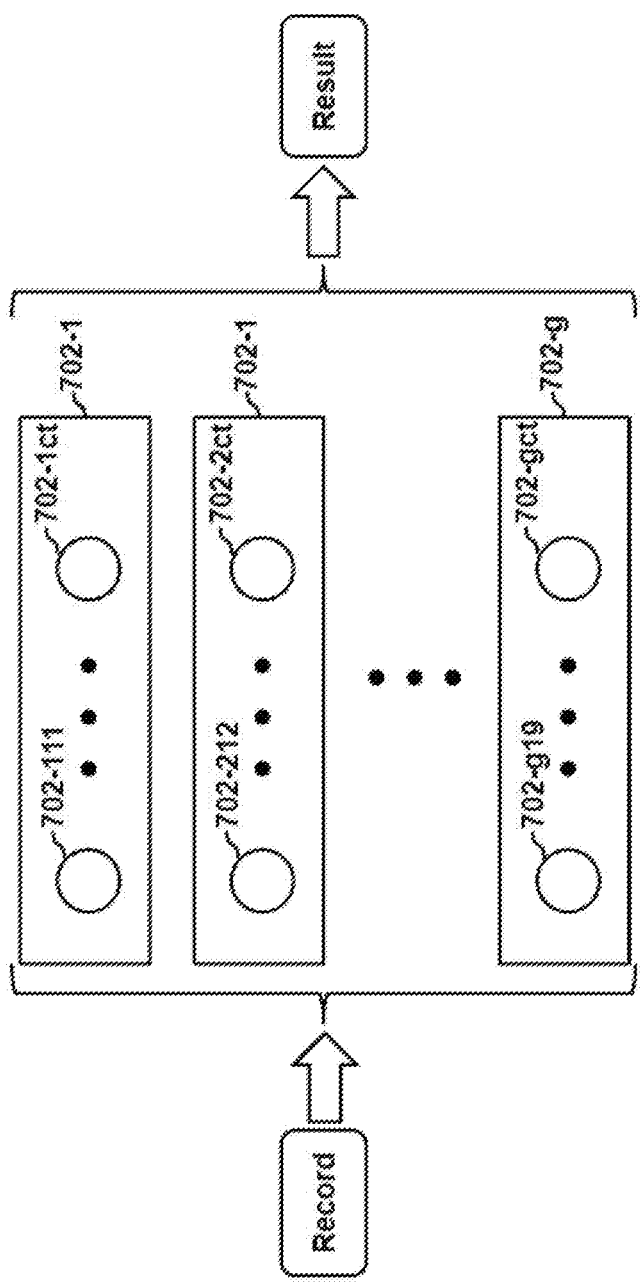
FIG. 7 shows a schematic diagram illustrating an example operation of the parallel predictor of FIG. 4, according to some embodiments of the present disclosure.

Referring back to FIG. 4, parallel predictor 412 is configured to compute prediction results with respective base models on the computation units based on the assignment determined by the strategy maker 410. FIG. 7 shows a schematic diagram illustrating an example operation of parallel predictor 412 according to some embodiments of the present disclosure. As shown in FIG. 7, g denotes parallel computation unit ID, c denotes cluster ID, and t denotes index in each cluster. For example, base model 702-111 is the first base model in the first cluster and assigned to the first computation unit 702-1, base model 702-212 is the second base model in the first cluster and assigned to the second computation unit 702-2, and base model 702-$g$19 is the 9th base model in the first cluster and assigned to the g-th computation unit 702-$g$.

Similarly, base model 702-1$ct$ is the t-th base model in the c-th cluster and assigned to the first computation unit 702-1 and base model 702-2$ct$ is the t-th base model in the c-th cluster and assigned to the second computation unit 702-2. It is noted that the numbers c and t may be different across base models 702-1$ct$, 702-2$ct$, and 702-$gct$ to represent different base models.

As shown in FIG. 7, a record of data is provided into the computation units 702-1, 702-2, 702-$g$. The record of data is represented by input data 414 in FIG. 4. Each base model is configured to output its prediction result based on the record of data using the respective computation unit. The results are then provided to merger 416, which is configured to merge the prediction results from the base models to obtain a final prediction result. For example, merger 416 as shown in FIG. 4 may select the prediction result obtained most by the base models to be the final prediction result, represented by output data 418 in FIG. 4. For example, if 60% of the prediction results are high, then the final prediction result is high. It is noted that the number 60% is provided for illustrative purpose only without suggesting any limitation as to the scope of the present disclosure. Alternatively, merger 416 may compute weighted average of the prediction results from the base models to obtain the final prediction result. Additional types of computations can be used in method 400 in some embodiments such as the median result, unweighted average, mode, etc.

It is possible to randomly select the same number of base models for each machine or thread. However, because the base models are different from each other, usually one has to wait for one machine or thread which includes most of long running models. Embodiments of the present disclosure can cluster the base models based on their performance-related features and distribute the base models from the clusters into computation units in equilibrium. As a result, the computation units can complete the prediction process substantially at the same pace.

The static analyzer 406 may generate one or more outliers in the clusters. For example, a time-consuming base model may be grouped into a cluster that is not that time-consuming. The performance of the base models may also shift over time and a properly grouped base model may not be properly group after a period of time. Parallel scoring system 400 as shown in FIG. 4 may further include dynamic analyzer 408 configured to monitor the performance of the base models and dynamically adjust the assignment of the base models to the computation units to achieve dynamic load equilibrium.

Figure 8:
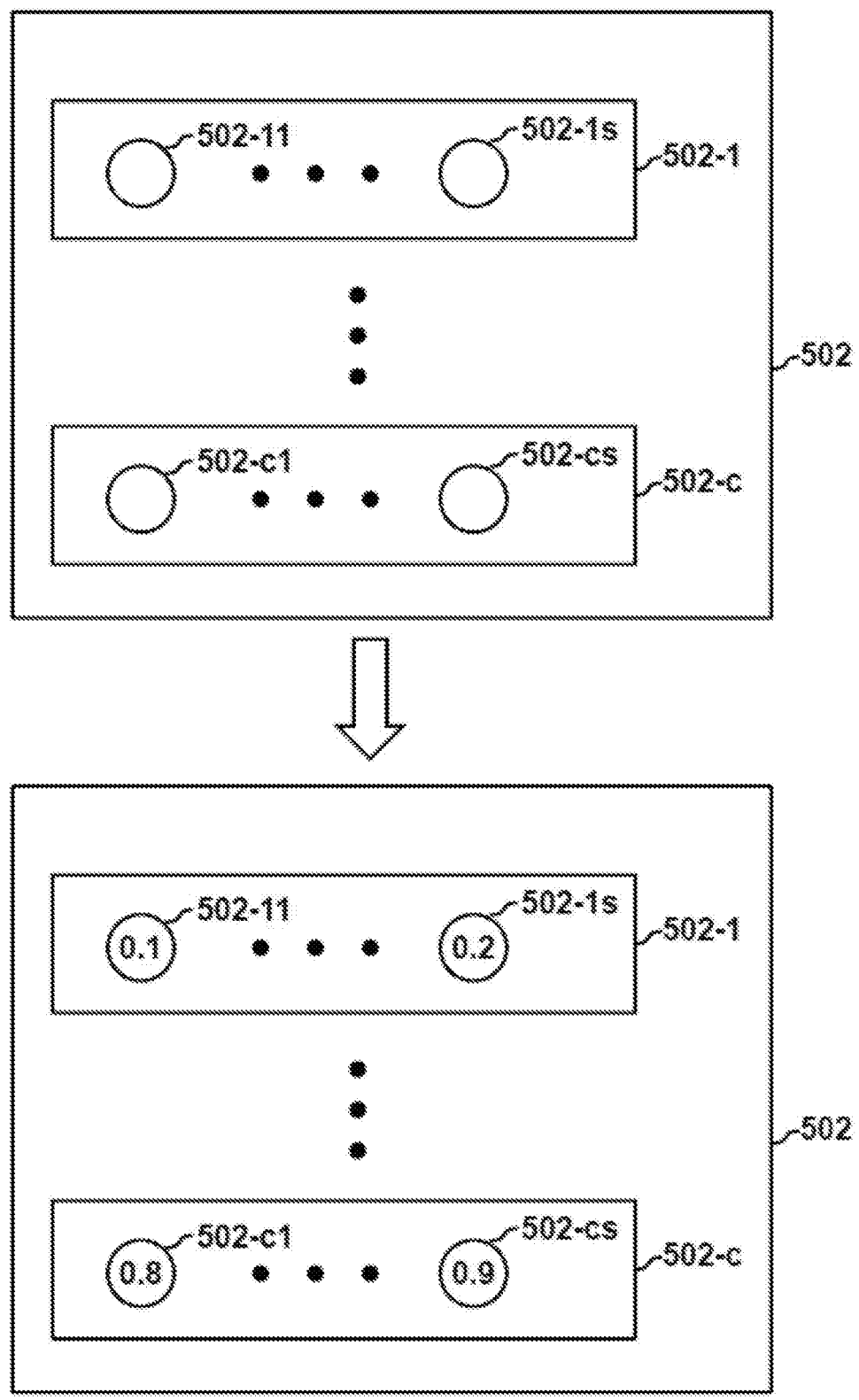
FIG. 8 shows a schematic diagram illustrating an example operation of dynamic analyzer in FIG. 4, according to some embodiments of the present disclosure.

FIG. 8 shows a schematic diagram illustrating an example operation of dynamic analyzer 408 of FIG. 4, according to some embodiments of the present disclosure. Dynamic analyzer 408 is configured to record the elapsed time (Tnw) of a number W of records for the base model n and calculate the average elapsed time $A_n$ of the number W of records, such as according to equations 1 through 3 as follows:

$$A_1 = (\Sigma_{m=1}^{W}(T1m))/W \quad (1)$$

$$A_2 = (\Sigma_{m=1}^{W}(T2m))/W \quad (2)$$

$$A_n = (\Sigma_{m=1}^{W}(Tnm))/W \quad (3)$$

Dynamic analyzer 408 can label average elapsed time $(A_1, A_2 \ldots A_w)$ to the base models. The average elapsed time of each base model is shown in FIG. 8. For example, the average time for the base model 502-11 is 0.1 milliseconds (ms) and the average time for the base model 502-1s is 0.2 ms. It is to be understood that the numbers are provided for illustrative purpose only without suggesting any limitations as to the scope of the present disclosure.

Dynamic analyzer 408 can then adjust workload of the computation units based on the average elapsed time of each base model. For example, outlier detection may be performed on the base models of each cluster and determine the outlier models from the base models in each cluster. It is to be understood that any suitable outlier detection method currently known or to be developed in the future can be used.

Figure 9:
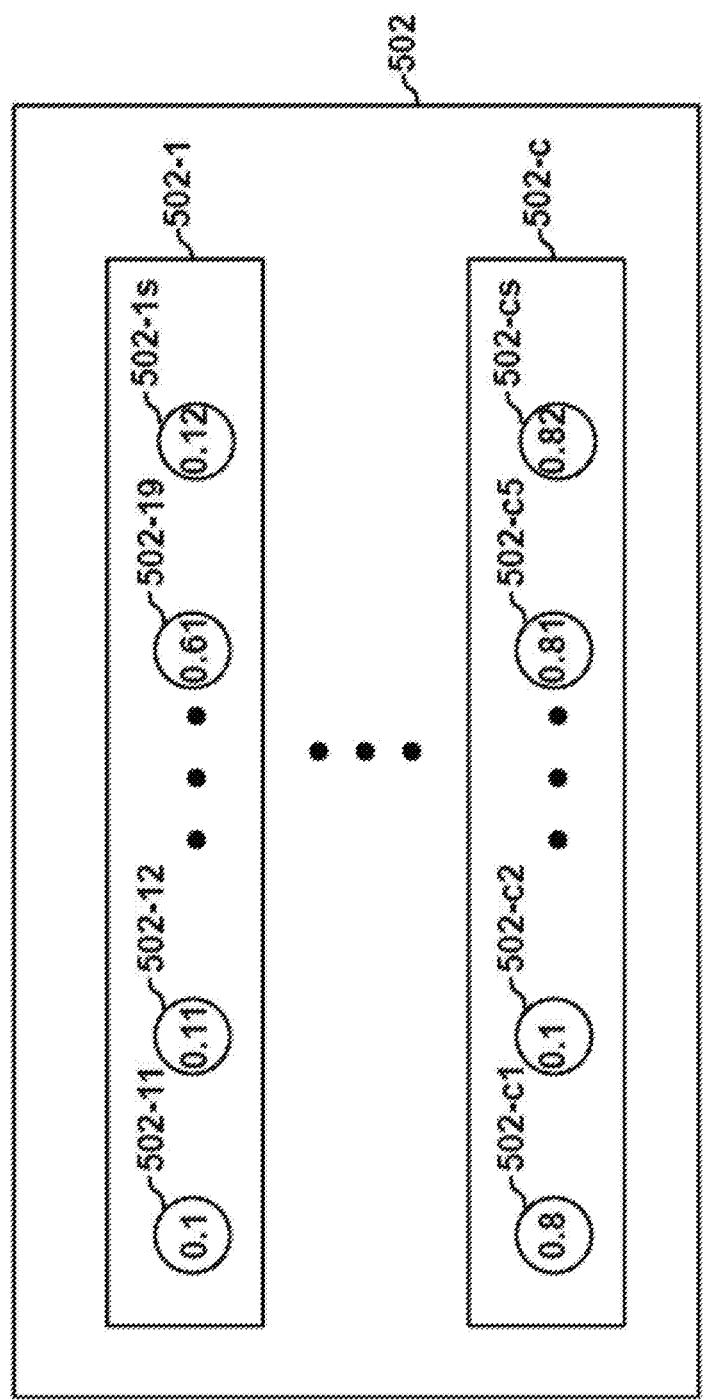
FIG. 9 shows a schematic diagram illustrating outlier detection, according to some embodiments of the present disclosure.

FIG. 9 shows a schematic diagram illustrating outlier detection according to some embodiments of the present disclosure. The outlier detection can be performed by dynamic analyzer 408 of FIG. 4. Cluster 502-1 includes base models 502-11, 502-12, ..., 502-19, and 502-1s, where base model 502-19 has an average time of 0.61 ms while the other base models in cluster 502-1 have an average time of about 0.1 ms. By outlier detection, base model 502-19 is determined to be an outlier model in cluster 502-1. Similarly, base model 502-c5 is determined to be an outlier model in cluster 502-c.

Figure 10:
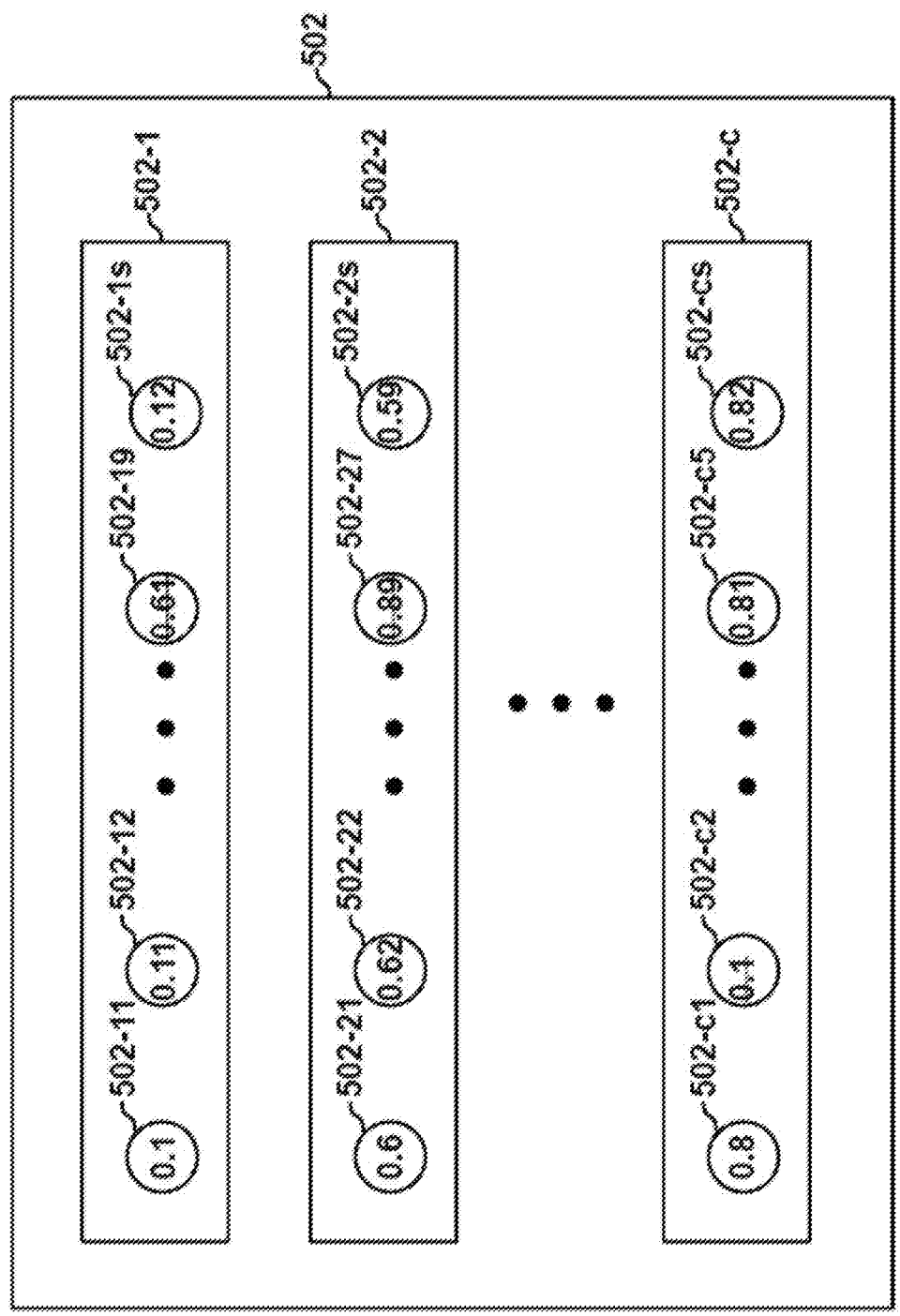
FIG. 10 shows a schematic diagram illustrating how to remove outliers from the clusters, according to some embodiments of the present disclosure.

FIG. 10 shows a schematic diagram illustrating how to remove outliers from the clusters according to some embodiments of the present disclosure. The example operation as shown in FIG. 10 can be performed by dynamic analyzer 408 of FIG. 4. As shown in FIG. 10, base models 502-19, 502-27, 502-c2 are determined to be outliers and are removed from clusters 502-1, 502-2, and 502-c, respectively.

Figure 11:
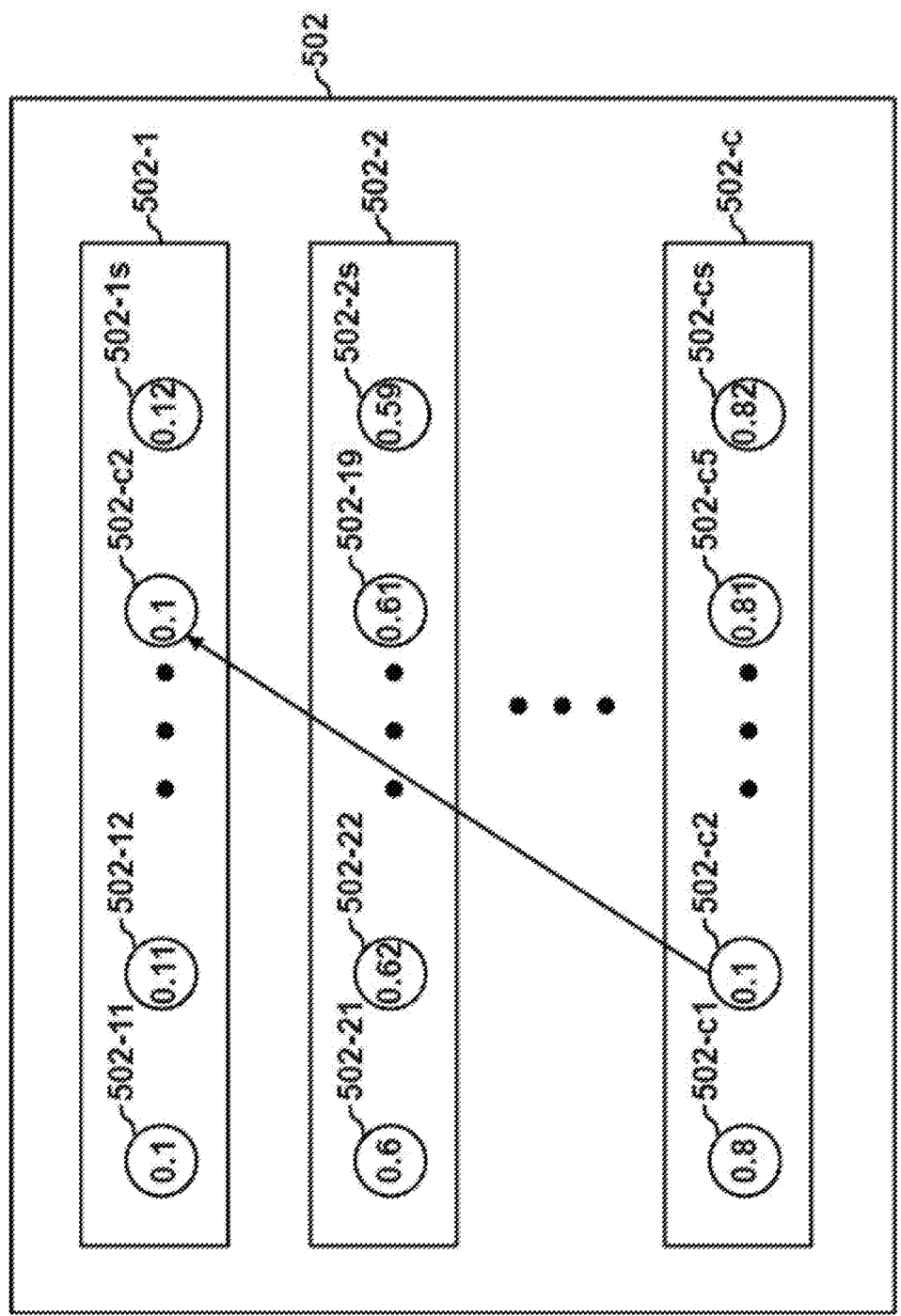
FIG. 11 shows a schematic diagram illustrating how to reassign the outliers to the clusters, according to some embodiments of the present disclosure.

FIG. 11 shows a schematic diagram illustrating how to reassign the outliers to the clusters according to some embodiments of the present disclosure. The example operation as shown in FIG. 11 can be performed by dynamic analyzer 408 of FIG. 4. Dynamic analyzer 408 can calculate the average elapsed time of all the remaining models for each cluster. For example, the average elapsed time Uc of the updated cluster c are calculated by equation 4 as follows:

$$Uc = \Sigma_{m=s}^{Wc} s(Tm)/Wc \quad (4)$$

where s denotes the start index of base model in the updated cluster c and We denotes the number of base models in the updated cluster c.

Dynamic analyzer 408 can reassign the outlier models to corresponding clusters based on the average elapsed time of the updated clusters. For example, dynamic analyzer 408 can determine which cluster has the closest average elapsed time to the outlier model and then reassign the outlier model to the cluster. As shown in FIG. 11, the outlier model 502-c2 has an average elapse time of 0.1 ms, which is closest to the average elapsed time of cluster 502-1. As a result, the outlier model 502-c2 will be reassigned to the cluster 502-1.

Dynamic analyzer 408 can send the updated clustering results to strategy maker 410 of FIG. 4, which will dispatch the base models based on the updated clustering results to the computation units.

Figure 12:
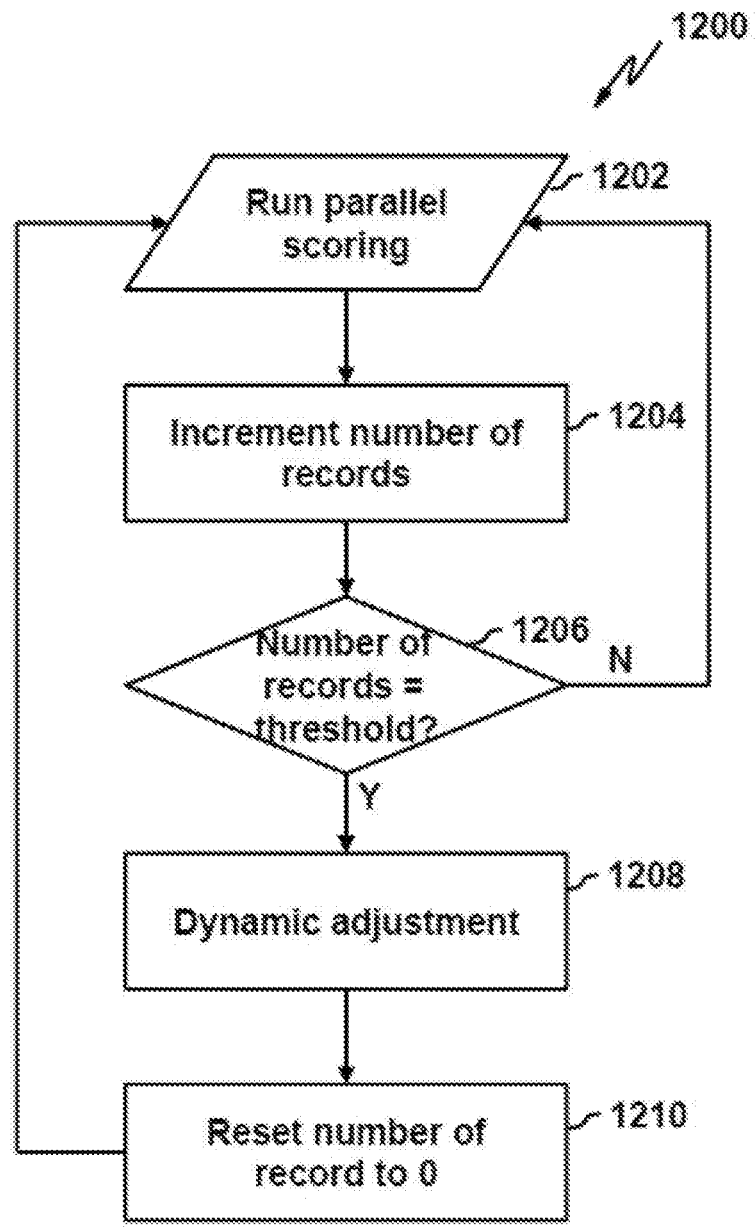
FIG. 12 shows a flowchart illustrating a method for dynamic adjustment, according to some embodiments of the present disclosure.

FIG. 12 shows a flowchart illustrating a method 1200 for dynamic adjustment, according to some embodiments of the present invention. For example, the dynamic workload adjustment may be performed based on a window size, for example, 100. The dynamic adjustment will be run based on every historical 100 records. It is to be understood that the number is provided for illustrative purpose only without suggesting any limitation as to the scope of the present disclosure and any suitable window size can be used instead.

At block 1202, parallel scoring is performed on a record of data. For example, the parallel scoring can be performed by parallel predictor 412 in FIG. 4. At block 1204, the number of records is incremented by one. At block 1206, it is determined whether the number of records equals to a threshold value (e.g., the number 100 above). The threshold value corresponds to a window size of the workload adjustment. If it is determined that the number of records equals to the threshold value, method 1200 proceeds to block 1208, where dynamic adjustment is performed to update the clusters and the assignment of the base models to the computation units. At block 1210, the number of records is reset to zero and proceed to block 1202 to run parallel scoring.

The embodiments of the present disclosure can achieve load balance and equilibrium, thereby avoiding bottleneck of other parallel scoring systems and improving the scoring performance of the ensemble model. The embodiments can be applied to any suitable base model and are not limited to a specific base model. In addition, the model assignment can be dynamically adjusted to further improve the accuracy and performance of the scoring system.

Figure 13:
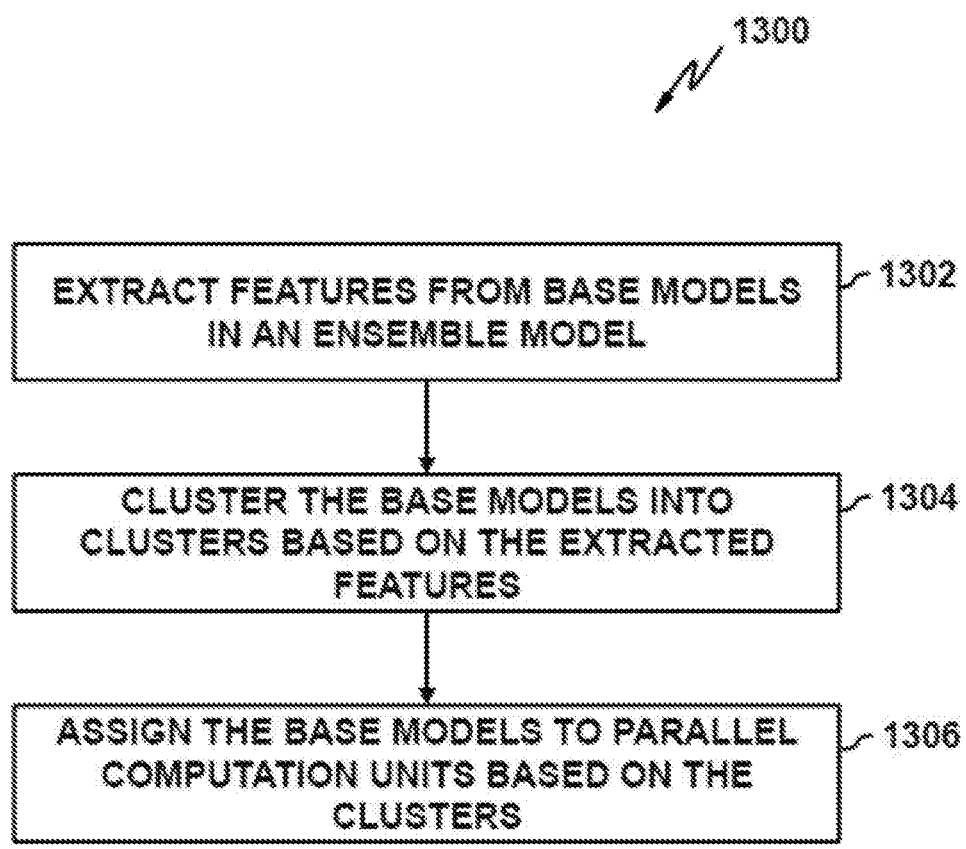
FIG. 13 shows a flowchart illustrating a method for parallelized scoring, according to some embodiments of the present disclosure.

FIG. 13 shows a flowchart illustrating a method 1300 for parallelized scoring, according to some embodiments of the present disclosure. Method 1300 can be implemented by parallel scoring system 400 as shown in FIG. 4 or parallelized scoring 96 as shown in FIG. 3. It is to be understood that method 1300 can be implemented by any other suitable system.

At block 1302, features are extracted from a plurality of base models in an ensemble model, the features associated with time performance of the base models. The plurality of base models are configured to provide respective prediction results and the ensemble model is configured to provide an overall prediction result from the prediction results of the plurality of base models. Block 1302 can be implemented by feature extractor 404 as shown in FIG. 4. Table I schematically shows features of an ensemble model based on tree models.

At block 1304, the plurality of base models are clustered into a plurality of clusters based on the extracted features. Block 1304 can be implemented by static analyzer 406 as shown in FIG. 4.

At block 1306, the plurality of base models are assigned to a plurality of parallel computation units based on the plurality of clusters. Block 1306 can be implemented by strategy maker 410 as shown in FIG. 4.

By clustering the base models and assigning the base models based on the clustering, the embodiments can balance workload of the computation units. As a result, the computation units can complete their respective tasks at substantially the same time, thereby improving real-time performance of the parallel scoring.

In some embodiments, method 1300 may further include identifying a first outlier base model in a first one of the plurality of clusters and updating the plurality of clusters by reassigning the first outlier base model to a second one of the plurality of clusters. The base models can then be assigned to the parallel computation units based on the updated clusters. This can be implemented by dynamic analyzer 408 as shown in FIG. 4.

In some embodiments, identifying the first outlier base model comprises determining average elapsed time of a number of records for each of the plurality of base models. For example, this can be implemented by the operation as shown in FIG. 8. Then, outlier detection can be performed on each of the plurality of clusters based on the average elapsed time to identify one or more outlier base models from the plurality of base models, the one or more base models comprising the first outlier base model. For example, outlier detection can be implemented as shown in FIG. 9.

In some embodiments, updating the plurality of clusters comprises: modifying the plurality of clusters by removing the one or more outlier base models from respective clusters, determining the average elapsed time of the number of records for each of the modified plurality of clusters, and updating the modified plurality of clusters by reassigning the one or more outlier base models to respective modified clusters based on the average elapsed time for the one or more outlier base models and the modified plurality of clusters. For example, this can be implemented by the operations as shown in FIGS. 10 and 11.

In some embodiments, assigning the plurality of base models to a plurality of parallel computation units comprises: assigning the plurality of base models from the plurality of clusters into the plurality of parallel computation units in a round-robin fashion. For example, this can be implemented by method 600 as shown in FIG. 6.

In some embodiments, method 600 further comprises determining a prediction result for a record by each of the plurality of parallel computation units using the plurality of base models assigned to the computation unit, and merging the prediction results from the plurality of parallel computation units to obtain an overall prediction result for the record. For example, this can be implemented by merger 416 as shown in FIG. 4.

It should be noted that the processing of parallelized scoring according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   extracting, by one or more processing units, features associated with time performance from a plurality of base models in an ensemble model, the plurality of base models being configured to provide respective prediction results, the ensemble model being configured to provide an overall prediction result from the prediction results of the plurality of base models;
   clustering, by the one or more processing units, the plurality of base models into a plurality of clusters based on the extracted features; and
   assigning, by the one or more processing units, the plurality of base models to a plurality of parallel computation units based on the plurality of clusters.

2. The method of claim 1, further comprising:
   identifying, by the one or more processing units, a first outlier base model in a first one of the plurality of clusters; and
   updating, by the one or more processing units, the plurality of clusters by reassigning the first outlier base model to a second one of the plurality of clusters.

3. The method of claim 2, further comprising:
   assigning, by the one or more processing units, the plurality of base models to the plurality of parallel computation units based on the updated plurality of clusters.

4. The method of claim 2, wherein identifying the first outlier base model comprises:
   determining, by the one or more processing units, average elapsed time of a number of records for each of the plurality of base models; and
   performing, by the one or more processing units, outlier detection on each of the plurality of clusters based on the average elapsed time to identify one or more outlier base models from the plurality of base models, the one or more base models comprising the first outlier base model.

5. The method of claim 4, wherein updating the plurality of clusters comprises:
   modifying, by the one or more processing units, the plurality of clusters by removing the one or more outlier base models from respective clusters;
   determining, by the one or more processing units, the average elapsed time of the number of records for each of the modified plurality of clusters; and
   updating, by the one or more processing units, the modified plurality of clusters by reassigning the one or more outlier base models to respective modified clusters based on the average elapsed time for the one or more outlier base models and the modified plurality of clusters.

6. The method of claim 1, wherein assigning the plurality of base models based on the plurality of clusters comprises:
   assigning, by the one or more processing units, the plurality of base models from the plurality of clusters into the plurality of parallel computation units in a round-robin fashion.

7. The method of claim 1, further comprising:
   causing, by the one or more processing units, a prediction result to be determined by each of the plurality of parallel computation units for each record using the plurality of base models assigned to the computation unit; and
   merging, by the one or more processing units, the prediction results from the plurality of parallel computation units to obtain an overall prediction result for the record.

8. A system comprising:
   a processor; and
   a memory having instructions stored thereon for execution by the processor, the instructions, when executed by the processor, cause the system to perform a method comprising:

extracting features associated with time performance from a plurality of base models in an ensemble model, the plurality of base models being configured to provide respective prediction results, the ensemble model being configured to provide an overall prediction result from the prediction results of the plurality of base models;

clustering the plurality of base models into a plurality of clusters based on the extracted features; and assigning the plurality of base models to a plurality of parallel computation units based on the plurality of clusters.

9. The system of claim 8, wherein the method further comprises:

identifying a first outlier base model in a first one of the plurality of clusters; and updating the plurality of clusters by reassigning the first outlier base model to a second one of the plurality of clusters.

10. The system of claim 9, wherein the method further comprises:

assigning the plurality of base models to the plurality of parallel computation units based on the updated plurality of clusters.

11. The system of claim 9, wherein identifying the first outlier base model comprises:

determining average elapsed time of a number of records for each of the plurality of base models; and performing outlier detection on each of the plurality of clusters based on the average elapsed time to identify one or more outlier base models from the plurality of base models, the one or more base models comprising the first outlier base model.

12. The system of claim 11, wherein updating the plurality of clusters comprises:

modifying the plurality of clusters by removing the one or more outlier base models from respective clusters;

determining the average elapsed time of the number of records for each of the modified plurality of clusters; and updating the modified plurality of clusters by reassigning the one or more outlier base models to respective modified clusters based on the average elapsed time for the one or more outlier base models and the modified plurality of clusters.

13. The system of claim 8, wherein assigning the plurality of base models based on the plurality of clusters comprises:

assigning the plurality of base models from the plurality of clusters into the plurality of parallel computation units in a round-robin fashion.

14. The system of claim 8, wherein the method further comprises:

causing a prediction result to be determined by each of the plurality of parallel computation units for each record using the plurality of base models assigned to the computation unit; and merging the prediction results from the plurality of parallel computation units to obtain an overall prediction result for the record.

15. A computer program product comprising a computer readable storage medium having program instructions embodied therewith, the program instructions executable by a processor to cause the processor to perform a method comprising:

extracting features associated with time performance from a plurality of base models in an ensemble model, the plurality of base models being configured to provide respective prediction results, the ensemble model being configured to provide an overall prediction result from the prediction results of the plurality of base models;

clustering the plurality of base models into a plurality of clusters based on the extracted features; and assigning the plurality of base models to a plurality of parallel computation units based on the plurality of clusters.

16. The computer program product of claim 15, wherein the method further comprises:

identifying a first outlier base model in a first one of the plurality of clusters; and updating the plurality of clusters by reassigning the first outlier base model to a second one of the plurality of clusters.

17. The computer program product of claim 16, wherein the method further comprises:

assigning the plurality of base models to the plurality of parallel computation units based on the updated plurality of clusters.

18. The computer program product of claim 16, wherein identifying the first outlier base model comprises:

determining average elapsed time of a number of records for each of the plurality of base models; and performing outlier detection on each of the plurality of clusters based on the average elapsed time to identify one or more outlier base models from the plurality of base models, the one or more base models comprising the first outlier base model.

19. The computer program product of claim 18, wherein updating the plurality of clusters comprises:

modifying the plurality of clusters by removing the one or more outlier base models from respective clusters;

determining the average elapsed time of the number of records for each of the modified plurality of clusters; and updating the modified plurality of clusters by reassigning the one or more outlier base models to respective modified clusters based on the average elapsed time for the one or more outlier base models and the modified plurality of clusters.

20. The computer program product of claim 15, wherein assigning the plurality of base models based on the plurality of clusters comprises:

assigning the plurality of base models from the plurality of clusters into the plurality of parallel computation units in a round-robin fashion.

\* \* \* \* \*